United States Patent
Yamagiwa et al.

(10) Patent No.: US 8,369,071 B2
(45) Date of Patent: Feb. 5, 2013

(54) PORTABLE TERMINAL

(75) Inventors: Daisuke Yamagiwa, Osaka (JP); Yasuhiro Shingin, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 203 days.

(21) Appl. No.: 12/868,266

(22) Filed: Aug. 25, 2010

(65) Prior Publication Data

US 2011/0051336 A1 Mar. 3, 2011

(30) Foreign Application Priority Data

Aug. 27, 2009 (JP) .................................. 2009-196366

(51) Int. Cl.
*G06F 1/16* (2006.01)
(52) U.S. Cl. .................................................. 361/679.01
(58) Field of Classification Search ................ 455/575.1, 455/575.2, 575.3, 575.4; 206/371; 16/362, 16/303, 297, 274, 302; 361/679.26, 679.27, 361/679.01, 679.04
See application file for complete search history.

(56) References Cited

U.S. PATENT DOCUMENTS

| | | |
|---|---|---|
| 2006/0211460 A1 | 9/2006 | Jeong et al. |
| 2007/0171195 A1 | 7/2007 | Kim et al. |
| 2009/0168369 A1 * | 7/2009 | Barnett .......................... 361/727 |
| 2009/0273894 A1 * | 11/2009 | Yang ........................ 361/679.27 |
| 2009/0298560 A1 | 12/2009 | Saitoh |

FOREIGN PATENT DOCUMENTS

| | | |
|---|---|---|
| EP | 1 703 704 A2 | 9/2006 |
| EP | 1 814 285 A1 | 8/2007 |
| EP | 1 965 570 A1 | 9/2008 |
| JP | 2008-193519 | 8/2008 |
| JP | 2008-193523 A | 8/2008 |

OTHER PUBLICATIONS

Extended European Search Report from a corresponding European application dated Aug. 11, 2011.

* cited by examiner

*Primary Examiner* — Hung Duong
(74) *Attorney, Agent, or Firm* — Morgan, Lewis & Bockius LLP

(57) ABSTRACT

A slide support mechanism included in a portable terminal includes: a first guide groove provided on a first housing side, and having a straight part parallel to the longitudinal direction of a display screen and an arc-shaped arc part continuous with one end of the straight part; and a first guide pin provided on a second housing side, and engaged with and held by the first guide groove in a slidable manner. Input parts which are covered by the second housing when the first guide pin is located at a cross-point between the straight part and the arc part are entirely or partially exposed in both cases of moving the first guide pin located at the cross-point between the straight part and the arc part along the straight part, and moving it along the arc part.

8 Claims, 8 Drawing Sheets

PORTABLE TERMINAL

This application is based on Japanese Patent Application No. 2009-196366 filed on Aug. 27, 2009, the contents of which are hereby incorporated by reference.

BACKGROUND OF THE INVENTION

1. Field of the Invention

The present invention relates to a portable terminal typified, for example, by a mobile device such as cellular phone, PDA, or smart phone, and more specifically relates to a slide-type portable terminal provided with a mechanism for sliding housings to each other.

2. Description of Related Art

Conventionally, various types of slide-type portable terminals provided with the mechanism for sliding housings to each other are proposed. Such slide-type portable terminals include, for example, a portable terminal configured so that a display screen (display part) for displaying image is switchable between a portrait state and a landscape state as shown in Patent Literature 1.

FIG. 8 is an exploded perspective view showing a structure of such a conventional slide-type portable terminal FIG. 9 is a perspective view of the conventional slide-type portable terminal with a display part being linearly slid while maintaining the portrait state, wherein a first housing is partially cut so that the operation of a support mechanism is easier to understand. FIG. 10 is a perspective view of the conventional slide-type portable terminal with the display part being rotated into the landscape state, wherein the first housing is partially cut so that the operation of the support mechanism is easier to understand.

As shown in FIGS. 8 to 10, a conventional slide-type portable terminal 100 includes a first housing 101 having a vertically long portrait display part 101a on a surface thereof, a second housing 102 having an operation part 103 on a surface thereof, and a support mechanism 104 for slidably supporting the first housing 101 relative to the second housing 102.

The support mechanism 104 includes first and second guide shafts 111 and 112 provided on the second housing 102 side; a first guide hole 121 for guiding the first guide shaft 111, which is provided on the first housing 101 side; and a second guide hole 122 for guiding the second guide shaft 112, which is provided on the first housing 101 side. The first guide hole 121 is composed of a vertically extending linear hole. The second guide hole 122 includes a straight part 122a parallel to the first guide hole 121 and an arc-shaped arc part 122b continuous with the lower end of the straight part 122a.

The first guide hole 121 and the second guide hole 122 are formed in a guide plate 120. The guide plate 120 is fixed to the first housing 101, whereby the first guide hole 121 and the second guide hole 122 are provided on the first housing 101 side.

In the thus-constituted conventional slide-type portable terminal 100, the first housing 101 is vertically slid relative to the second housing 102 by sliding the second guide shaft 112 along the straight part 122a of the second guide hole 122 while sliding the first guide shaft 111 along the first guide hole 121. In FIG. 9, this slide movement is completed, and the operation part 103 is partially exposed.

The first housing 101 is rotated relative to the second housing 102 by sliding the second guide shaft 112 along the arc part 122b of the second guide hole 122 from a state where the first housing 101 completes the above-mentioned slide movement (the state shown in FIG. 9). FIG. 10 shows a state in which the rotational slide movement of the second housing 102 is completed, and in this state, the display part 101a is switched from the portrait state to the landscape state. In this state, the operation part 103 formed on the surface of the second housing 102 is entirely exposed.

This structure is convenient since the linear movement and rotational movement of the first housing 101 relative to the second housing 102 can be performed by one slide support mechanism without using two separate mechanisms for linear movement and rotational movement.

Patent Literature 1: JP-A-2008-193519

SUMMARY OF THE INVENTION

When the slide-type portable terminal is unused, the operation part 103 provided on the second housing 102 is generally kept covered by the first housing 101 (in a closed state). Namely, this closed state is the most common state for the slide-type portable terminal. Therefore, if a usage state with the operation part 103 exposed (an opened state) has two options of a portrait state and a landscape state with respect to the display part 101a as described above, it is convenient to select one of the two states from the closed state.

With regard to this point, the slide-type portable terminal 100 disclosed in Patent Literature 1 must be put into the opened state with the display part 101a in a portrait state before the opened state with the display part 101a in a landscape state is attained. Namely, in case of the slide-type portable terminal 100 disclosed in Patent Literature 1, two steps of slide action must be performed to use the display part 101a in the landscape state from the closed state (as described above, it is considered that the slide operation is most frequently started from this state), and users may feel such an operation troublesome.

Thus, the object of the present invention is to provide a portable terminal which can attain each state of an opened state with a display screen in a portrait state and an opened state with a display screen in a landscape state only by performing one step of slide action from the closed state.

To attain the above-mentioned object, a portable terminal according to the present invention includes: a first housing including a plurality of input parts; a second housing superposed on the first housing and having a display screen that is substantially rectangular shaped; a slide support mechanism for slidably supporting the second housing relative to the first housing, wherein the slide support mechanism includes: a first guide groove provided on one side of the first housing side and the second housing side, and having a straight part parallel to the longitudinal direction of the display screen and an arc-shaped arc part continuous with one end of the straight part; and a first guide pin provided on the other side of the first housing side and the second housing side, and engaged with and held by the first guide groove in a slidable manner, and wherein the input parts which are covered by the second housing when the first guide pin is located at a cross-point between the straight part and the arc part are entirely or partially exposed in both cases of moving the first guide pin located at the cross-point between the straight part and the arc part along the straight part, and moving it along the arc part.

According to this structure, the input parts covered by the housing having the display screen are exposed in both cases of sliding the first guide pin located at the cross-point between the straight part and the arc part constituting the first guide groove along the straight part and sliding it along the arc part. Namely, in case of the portable terminal of this structure, the opened state with a display screen in a portrait state and the opened state with a display screen in a landscape state can be selectively attained only by performing one step of slide action from the closed state in which the first guide pin exists at the cross-point between the straight part and the arc part. In case of the portable terminal of this structure, since the linear movement and rotational movement of the second housing relative to the first housing can be performed by one slide support mechanism without using two separate mechanisms for linear movement and rotational movement, the structure of portable terminal can be prevented from being complicated.

In the portable terminal of the above-mentioned structure, it is preferable that the slide support mechanism further includes a linear second guide groove parallel to the straight part, which is provided on the same side as the first guide groove of the first housing side and the second housing side, and a second guide pin to be engaged with and held by the second guide groove in a slidable manner, which is provided on the same side as the first guide pin of the first housing side and the second housing side.

This structure enables stable slide movement of the second housing relative to the first housing since two sets of guide groove and guide pin are provided to support the two housings so as to be slidable to each other.

In the portable terminal of the above-mentioned structure, the slide support mechanism preferably includes an auxiliary spring which assists the slide movement of the second housing. As a concrete structure of this case, the auxiliary spring may be a torsion spring, with one end of the torsion spring being rotatably supported by the first guide pin, and the other end thereof being rotatably supported by a spring holding pin provided on the same side as the first guide groove of the first housing side and the second housing side.

According to this structure, the operability in the slide movement of the second housing relative to the first housing can be improved by the auxiliary spring which assists the slide movement. Since the operability of the portable terminal of this structure is thus improved, users prefer the portable terminal.

In the portable terminal of the above-mentioned structure, at least a part of members forming the slide support mechanism may be attached directly to the first housing and the second housing. According to such a structure, the number of parts can be reduced as much as possible.

In the portable terminal of the above-mentioned structure, the slide support mechanism may be composed of a unit member including a first member to be fixed to the first housing and a second member to be fixed to the second housing, which is provided to be slidable relative to the first member. The unitization of the slide support mechanism as described above facilitates inexpensive application of the present invention to plural kinds of portable terminals.

As described above, according to the present invention, a convenient portable terminal which can attain each of the opened state with a display screen in a portrait state and the opened state with a display screen in a landscape state only by performing one step of slide action from the closed state.

DETAILED DESCRIPTION OF PREFERRED EMBODIMENTS

A preferred embodiment of the portable terminal of the present invention will be described in detail in reference to the accompanying drawings. The portable terminal of the present invention is implemented, for example, as a cellular phone, a PHS (Personal Handy-phone System) terminal, a PDA (Personal Digital Assistant), a smart phone, a PC (Personal Computer), a portable game machine and the like.

Figure 1:
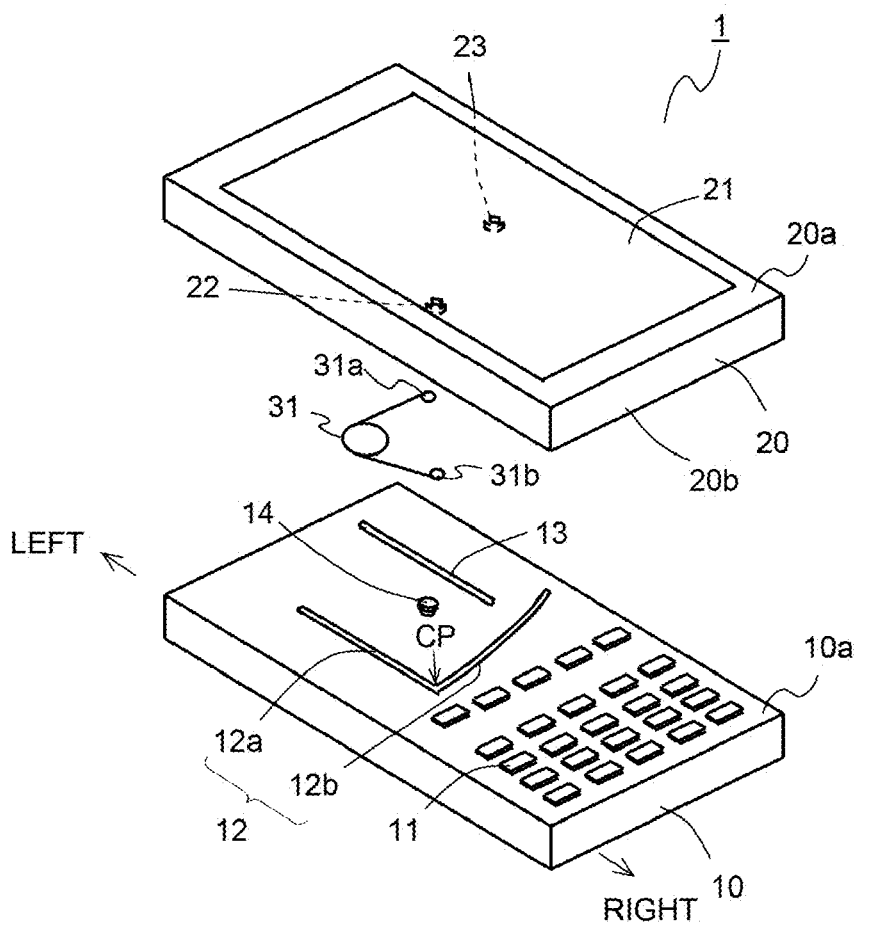
FIG. 1 is an exploded perspective view showing a rough structure of a portable terminal according to a preferred embodiment of the present invention.

FIG. 1 is an exploded perspective view showing a rough structure of a portable terminal according to the present embodiment. As shown in FIG. 1, a portable terminal 1 of the present embodiment includes an operation-side housing 10, and a display-side housing 20 superposed on the operation-side housing 10. The operation-side housing 10 corresponds to an embodiment of the first housing of the present invention, and the display-side housing 20 corresponds to an embodiment of the second housing of the present invention.

The operation-side housing 10 is formed, for example, of synthetic resin or metal, and has a substantially cuboid shape. A plurality of input keys (input parts) 11 is provided on an upper surface 10a of the operation-side housing 10 (a surface opposed to the display-side housing 20 to be superposed). A user can perform operation of various functions of the portable terminal 1 using the plurality of input keys 11. As shown in FIG. 1, the plurality of input keys 11 is provided in an area on one longitudinal side (the right area) of the upper surface 10a of the operation-side housing.

The number or layout of the plurality of input keys, which is shown in the drawings as one example, can be changed appropriately. The input parts provided so that various functions of the portable terminal 1 can be operated may be another form, for example, a touch panel or the like, in addition to the button form (input keys 11) as shown in the present embodiment.

On the upper surface 10a of the operation-side housing 10, a first guide groove 12 and a second guide groove 13 are provided in addition to the plurality of input keys 11. The first guide groove 12 and the second guide groove 13 are directly formed on the operation-side housing 10, and these grooves are provided in an area on the other longitudinal side (the left area) of the upper surface 10a of the operation-side housing. The first guide groove 12 has a straight part 12a extending in parallel to the longitudinal direction of the upper surface 10a of the operation-side housing (which is matched to the longitudinal direction of a display screen 21 of the display-side housing 20 to be described later in detail), and an arc-shaped arc part 12b continuous with one end (the right end) of the straight part 12a. The second guide groove 13 is a linear groove parallel to the straight part 12a of the first guide groove 12.

A spring holding pin 14, having substantially T-shaped section, for holding one end 31a of a torsion spring 31 disposed between the operation-side housing 10 and the display-side housing 20 is provided between the straight part 12a of the first guide groove 12 and the second guide groove 13 on the upper surface 10a of the operation-side housing. The spring holding pin 14 is attached directly to the operation-side housing 10. The spring holding pin 14 may be provided in an integrated manner with the operation-side housing 10 as occasion demands, although it is a member separate from the operation-side housing 10 in the present embodiment.

The display-side housing 20 is formed, for example, of synthetic resin or metal, and has a substantially cuboid shape. In the portable terminal 1 of the present embodiment, each of the operation-side housing 10 and the display-side housing 20 has a rectangular shape in planar view from above, which has substantially the same relation of vertical and transverse length. The display-side housing 20 is mounted with a display unit composed of, for example, a liquid crystal display or the like so that the display screen 21 having a substantially rectangular shape is disposed on an upper surface 20a thereof.

A first guide pin 22 and second guide pin 23, both pins having a substantially T-shaped section, are provided on a lower surface 20b of the display-side housing 20. The two guide pins 22 and 23 are attached directly to the lower surface 20b of the display-side housing 20. In FIG. 1, the two guide pins 22 and 23 are shown by broken lines since they are invisible in a normal situation. The two guide pins 22 and 23 may be provided in an integrated manner with the display-side housing 20 as occasion demands, although these are members separate from the display-side housing 20 in the present embodiment.

The first guide pin 22 of the display-side housing 20 is engaged with and held by the first guide groove 12 of the operation-side housing 10 and the second guide pin 23 of the display-side housing 20 is engaged with and held by the second guide groove 13 of the operation-side housing 10 so that the operation-side housing 10 and the display-side housing 20 are integrated together. The first guide pin 22 is engaged with and held by the first guide groove 12 in a slidable state, and the second guide pin 23 is engaged with and held by the second guide groove 13 in a slidable state. In other words, the display-side housing 20 is supported in a manner as to be slidable relative to the operation-side housing 10 in the portable terminal 1.

The operation-side housing 10 and the display-side housing 20 are electrically connected with each other by a signal cable not shown. The signal cable is formed of a flexible member, and configured so that the electric connection between the display-side housing 20 and operation-side housing 10 can be maintained even if the display-side housing 20 is slid relative to the operation-side housing 10.

In the portable terminal 1 of the present embodiment, when the operation-side housing 10 is integrated with the display-side housing 20, the torsion spring 31 is rotatably held between the both. One end 31a of the torsion spring 31 is rotatably supported by the spring holding pin 14 provided on the operation-side housing 10, and the other end 31b is rotatably supported by the first guide pin 22 provided on the display-side housing 20. The torsion spring 31 functions as an auxiliary spring which assists the slide movement of the display-side housing 20 relative to the operation-side housing 10, and the details will be described later.

The first guide groove 12, the second guide groove 13, the first guide pin 22 and the second guide pin 23 in the portable terminal 1 are an embodiment of the slide support mechanism in the present invention. In the portable terminal 1 of the present embodiment, the slide support mechanism also includes the spring holing pin 14 and the torsion spring 31.

The operation of the thus-constituted portable terminal 1 of the present embodiment will be described in reference to FIGS. 2, 3A, 3B, 4A, 4B, 5A, 5B, 6A and 6B.

Figure 2:
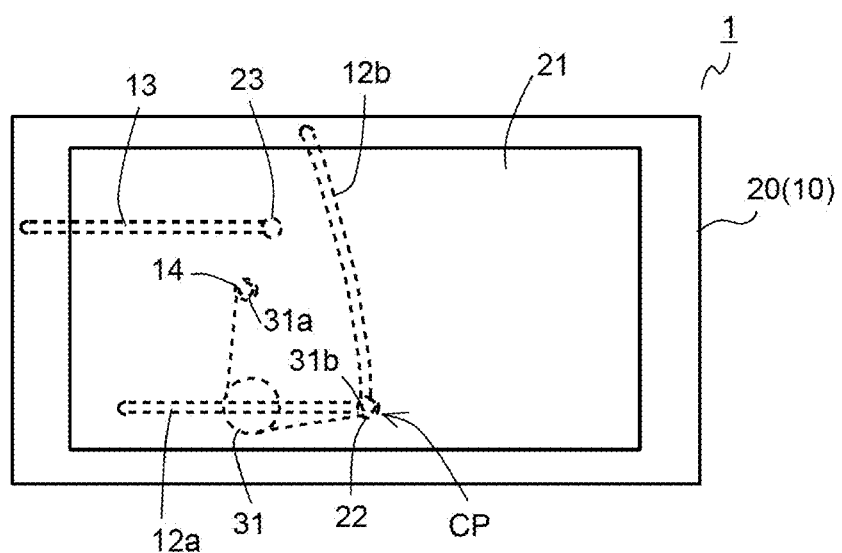
FIG. 2 is a schematic plan view showing a closed state of the portable terminal of the embodiment.

FIG. 2 is a schematic plan view showing a closed state of the portable terminal of the present embodiment. In FIG. 2, the members constituting the slide support mechanism are shown by broken lines so that the operation of the portable terminal 1 is easier to understand. In the closed state shown in FIG. 2, the operation-side housing 10 and the display-side housing 20 having the same vertical and transverse size in planar view from above are superposed so that the respective sides are overlapped to each other. In this sate, all of the plurality of input keys 11 provided on the upper surface 10a of the operation-side housing 10 is covered by the display-side housing 20.

In the present specification, a state such that the portable terminal 1 is in a compact state with the plurality of input keys 11 of the operation-side housing 10 being covered by the display-side housing 20 as shown in FIG. 2 is described as the closed state. A state such that the input keys 11 covered by the display-side housing 20 are exposed by sliding the display-side housing 20 relative to the operation-side housing 10 is described as the opened state.

In the present embodiment, the operation-side housing 10 and the display-side housing 20 have the same size in planar view from above, and all of the plurality of input keys 11 formed on the upper surface 10a of the operation-side housing is covered by the display-side housing 20 in the closed state. However, the present invention can be applied even when the operation-side housing 10 and the display-side housing 20 are differed in size in planar view from above, and in this case, a part of the plurality of input keys 11 formed on the upper surface 10a of the operation-side housing is exposed even in the closed state. Thus, as the closed state in the present invention, a state such that the display-side housing 20 covers all or part of the plurality of input keys 11 formed on the upper surface 10a of the operation-side housing is supposed.

When the portable terminal 1 of the present embodiment is in the closed state, a user cannot perform operation of the portable terminal 1 using the input keys 11 provided on the upper surface 10a of the operation-side housing. Therefore, it is supposed that this closed state of the portable terminal 1 is used at nonuse when operation of the portable terminal is not performed, at viewing of moving image, at telephone use, or the like.

In the closed state, the first guide pin 22 is located at a cross-point CP between the straight part 12a and the arc part 12b of the first guide groove 12 as shown in FIG. 2. The second guide pin 23 is located at the right end of the second guide groove 13.

Figure 3A:
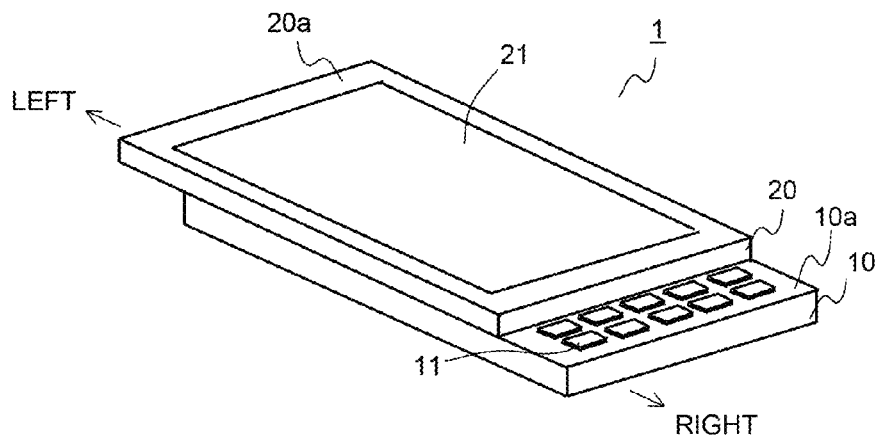
FIG. 3A is a schematic perspective view showing the process of shifting from the closed state to an opened state in the portable terminal of the embodiment by linearly moving a display-side housing in parallel to the longitudinal direction of a display screen relative to an operation-side housing, wherein the display-side housing is in motion.
Figure 3B:
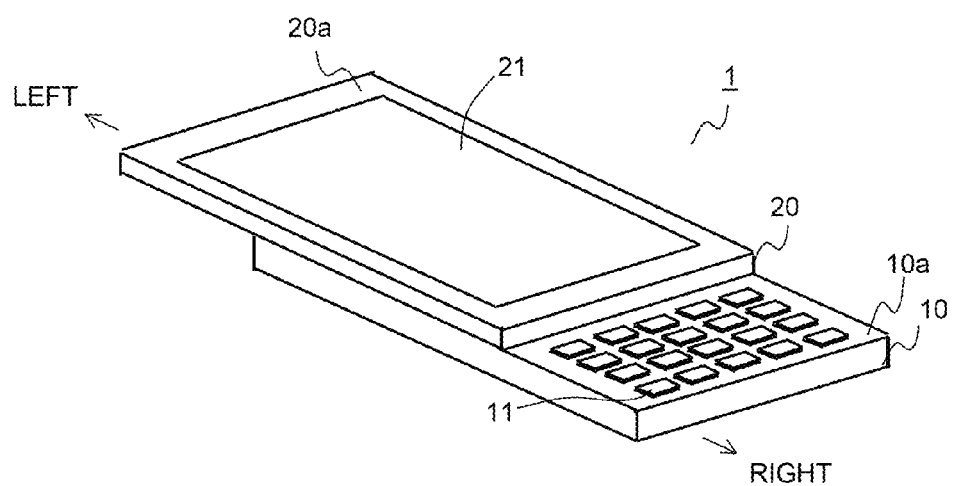
FIG. 3B is a schematic perspective view showing the process of shifting from the closed state to the opened state in the portable terminal of the embodiment by linearly moving the display-side housing in parallel to the longitudinal direction of the display screen relative to the operation-side housing, wherein the movement is completed.
Figure 4A:
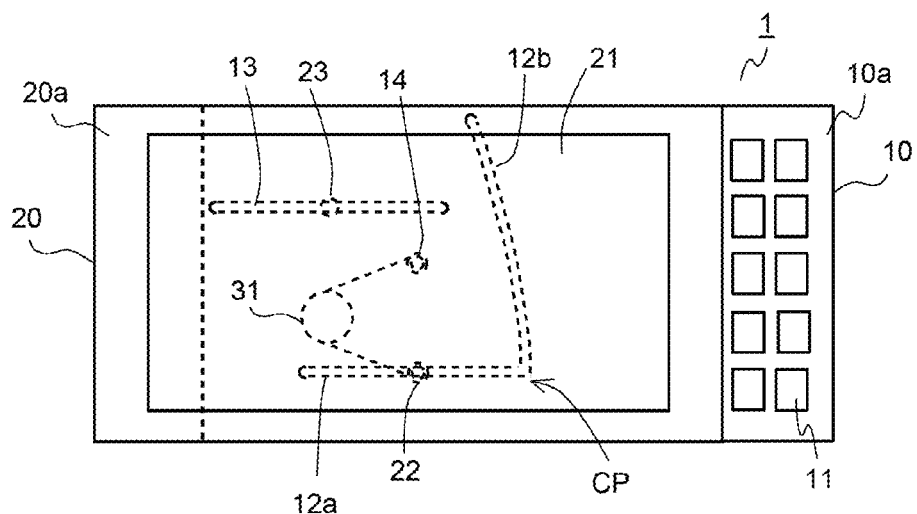
FIG. 4A is a schematic plan view showing the process of shifting from the closed state to the opened state in the portable terminal of the embodiment by linearly moving the display-side housing in parallel to the longitudinal direction of the display screen relative to the operation-side housing, wherein the display-side housing is in motion.
Figure 4B:
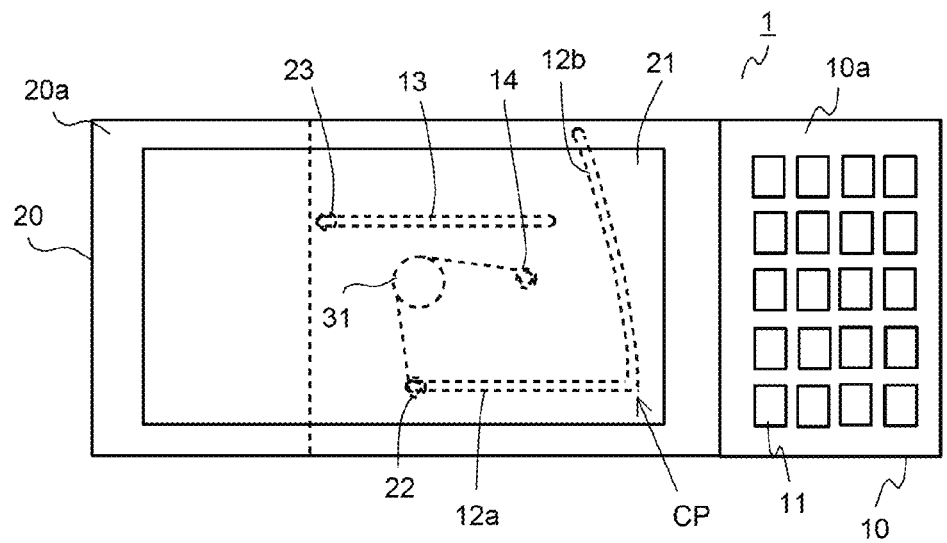
FIG. 4B is a schematic plan view showing the process of shifting from the closed state to the opened state in the portable terminal of the embodiment by linearly moving the display-side housing in parallel to the longitudinal direction of the display screen relative to the operation-side housing, wherein the movement is completed.

FIGS. 3A and 3B are schematic perspective views showing the process of shifting from the closed state to the opened state in the portable terminal of the present embodiment by linearly moving the display-side housing in parallel to the longitudinal direction of the display screen relative to the operation-side housing, wherein the display-side housing is in motion in FIG. 3A, and the movement is completed in FIG. 3B. FIGS. 4A and 4B are schematic plan views showing the process of shifting from the closed state to the opened state in the portable terminal of the present embodiment by linearly moving the display-side housing in parallel to the longitudinal direction of the display screen relative to the operation-side housing, wherein the display-side housing is in motion in FIG. 4A, and the movement is completed in FIG. 4B. FIG. 4A is a plan view of the state shown in FIG. 3A, and FIG. 4B is a plan view of the state shown in FIG. 3B. In FIGS. 4A and 4B, the members constituting the slide support mechanism are shown by broken lines so that the operation of the portable terminal 1 is easier to understand.

The opened state shown in FIG. 3B and FIG. 4B (hereinafter often referred also to as first opened state) is attained by sliding the first guide pin 22 to the left along the straight part 12a of the first guide groove 12, and also sliding the second guide pin 23 to the left along the second guide groove 13, which is linearly provided, from the closed state (refer to FIG. 2).

After the slide movement of the first and second guide pins 22 and 23 to the left is started, the input keys 11 on the upper surface 10a of the operation-side housing which have been covered by the display-side housing 20 are gradually exposed (refer to FIGS. 3A and 4A). The first and second guide pins 22 and 23 can no longer slide when they continue the slide movement and abut on the right ends of the straight part 12a and the second guide groove 13 respectively, and the slide movement is completed (refer to FIG. 4B). In this state, the user can operate the portable terminal 1 using the input keys 11 while viewing the display screen 21.

In the first opened state (the state shown in FIGS. 3B and 4B), the plurality of input keys 11 provided on the upper surface 10a of the operation-side housing is not entirely but partially exposed. However, without being limited to this configuration, the plurality of input keys 11 provided on the upper surface 10a of the operation-side housing may be exposed entirely.

The portable terminal 1 of the present embodiment includes the torsion spring 31 provided between the operation-side housing 10 and the display-side housing 20 as described above. The operation of the torsion spring 31 in the course of shifting from the closed state to the first opened state will be then described.

In the closed state (the state shown in FIG. 2), the display-side housing 20 is difficult to slide relative to the operation-side housing 10 due to the biasing force of the torsion spring 31. Namely, a situation such that the display-side housing 20 spontaneously slides relative to the operation-side housing 10, resulting in the opened state, hardly occurs. Therefore, the user must apply a force in the sliding direction to linearly slide the display-side housing 20 to the left relative to the operation-side housing 10.

When the force is applied in the sliding direction by the user, the torsion spring 31 is compressed while being rotated clockwise (refer to FIG. 4A), and reaches the mostly compressed state at about the midpoint of the course from start of slide movement to completion of slide movement (corresponding to the state shown in FIG. 4A). When the position of the display-side housing 20 relative to the display-side housing 20 is shifted in the sliding direction from the mostly compressed state, the slide movement of the display-side housing 20 is assisted by the reaction of the compressed torsion spring 31. While the torsion spring 31 assists the slide movement, the torsion spring 31 is extended while being further rotated clockwise. When the first opened state is attained (when the slide movement is completed), the torsion spring 31 comes to have a biasing force substantially equal to that in the closed state. In this first opened state, the slide movement is difficult to perform without application of force at the beginning by the user, similarly to the closed state.

Figure 5A:
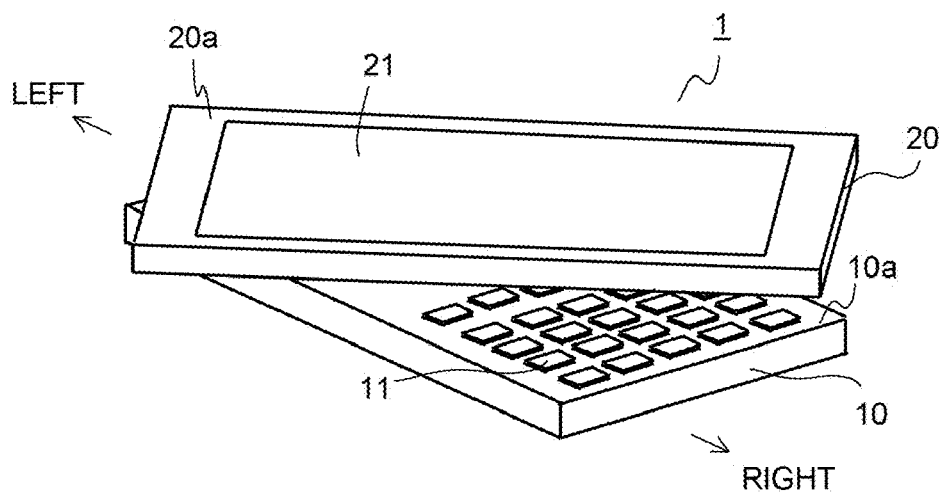
FIG. 5A is a schematic perspective view showing the process of shifting from the closed state to the opened state in the portable terminal of the embodiment by rotationally moving the display-side housing relative to the operation-side housing, wherein the display-side housing is in motion.
Figure 5B:
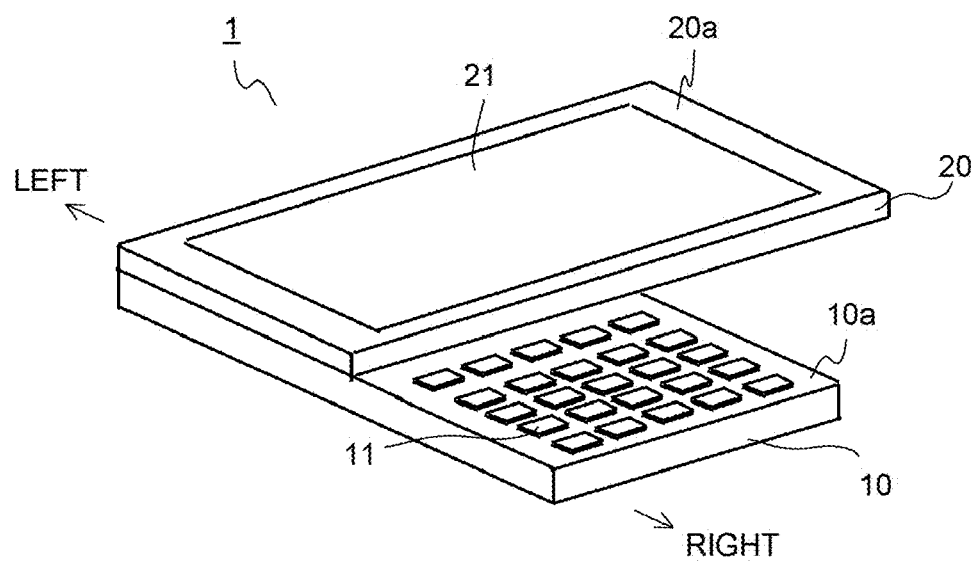
FIG. 5B is a schematic perspective view showing the process of shifting from the closed state to the opened state in the portable terminal of the embodiment by rotationally moving the display-side housing relative to the operation-side housing, wherein the movement is completed.
Figure 6A:
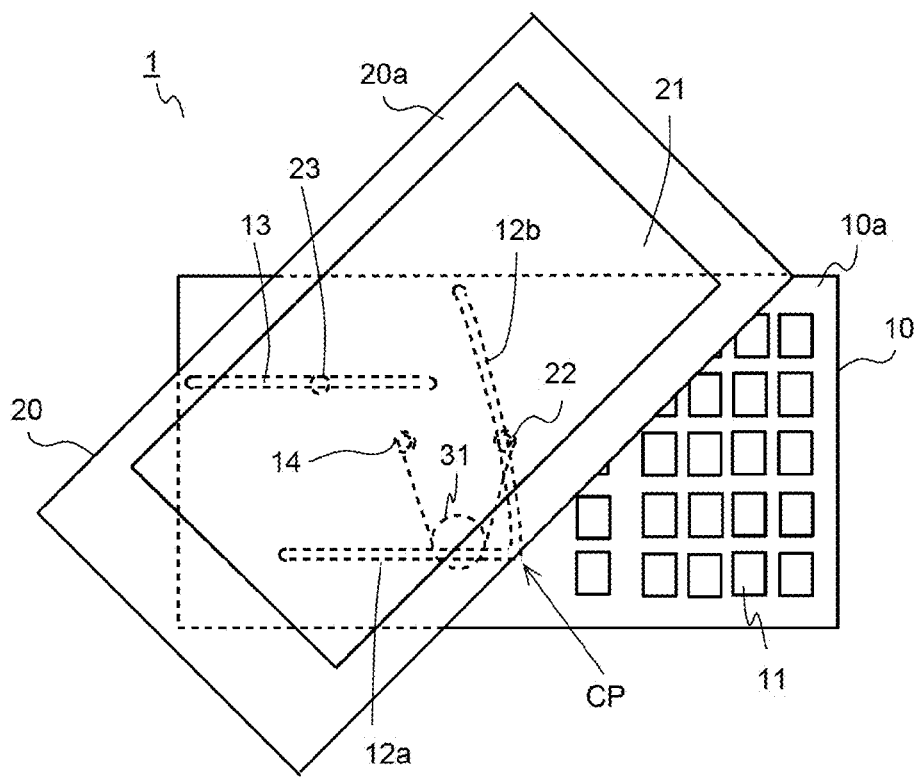
FIG. 6A is a schematic plan view showing the process of shifting from the closed state to the opened state in the portable terminal of the embodiment by rotationally moving the display-side housing relative to the operation-side housing, wherein the display-side housing is in motion.
Figure 6B:
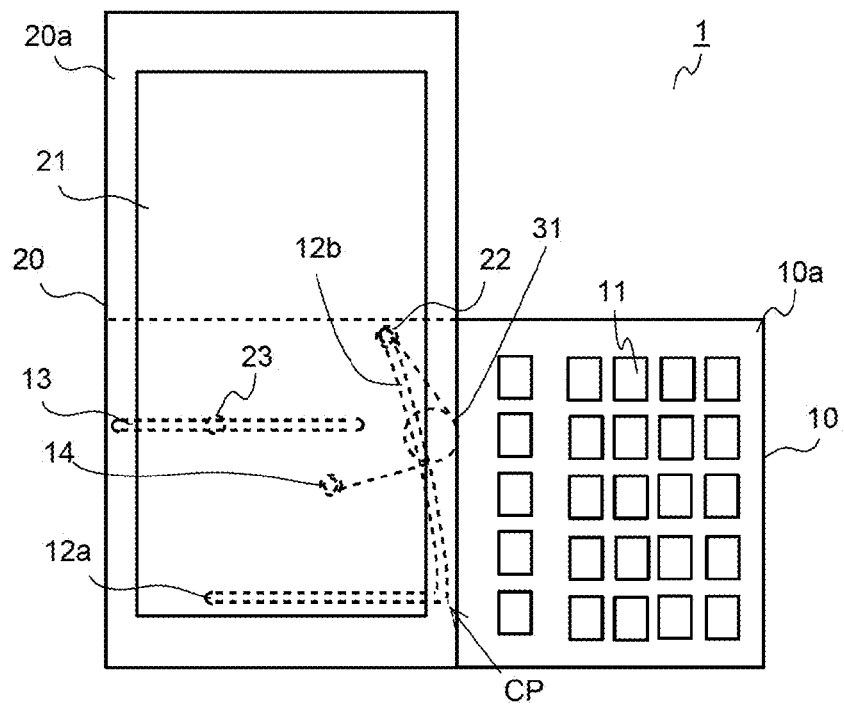
FIG. 6B is a schematic plan view showing the process of shifting from the closed state to the opened state in the portable terminal of the embodiment by rotationally moving the display-side housing relative to the operation-side housing, wherein the movement is completed.

FIGS. 5A and 5B are schematic perspective views showing the process of shifting from the closed state to the opened state in the portable terminal of the present embodiment by rotationally moving the display-side housing relative to the operation-side housing, wherein the display-side housing is in motion in FIG. 5A, and the movement is completed in FIG. 5B. FIGS. 6A and 6B are schematic plan views showing the process of shifting from the closed state to the opened state in the portable terminal of the present embodiment by rotationally moving the display-side housing relative to the operation-side housing, wherein the display-side housing is in motion in FIG. 6A, and the movement is completed in FIG. 6B. FIG. 6A is a plan view of the state shown in FIG. 5A, and FIG. 6B is a plan view of the state shown in FIG. 5B. In FIGS. 6A and 6B, the members constituting the slide support mechanism are shown by broken lines so that the operation of the portable terminal 1 is easier to understand.

The opened state shown in FIGS. 5B and 6B (hereinafter often referred also to as second opened state) is attained by sliding the first guide pin 22 upward and leftward along the arc part 12b of the first guide groove 12, and also sliding the second guide pin 23 to the left along the second guide groove 13, which is linearly provided, from the closed state (refer to FIG. 2).

After the slide movement of the first and second guide pins 22 and 23 is started, the input keys 11 on the upper surface 10a of the operation-side housing which have been covered by the display-side housing 20 are gradually exposed (refer to FIGS. 5A and 6A). The first guide pin 22 can no longer slide when it continues the slide movement and abuts on an end part of the arc part 12b (the end opposite to the cross-point CP between the straight part 12a and the arc part 12b), and the slide movement is completed (refer to FIG. 6B). In this state, all of the input keys 11 on the upper surface 10a of the operation-side housing are exposed, so that the user can operate the portable terminal 1 using the input keys 11 while viewing the display screen 21.

In the second state, the second guide pin 23 moves only to a position slightly closer to the left from the middle point of the second guide groove 13 without reaching the left end of the second guide groove 13. Although all of the input keys 11 provided on the upper surface 10a of the operation-side housing are exposed by the relative rotational movement of the display-side housing 20 in the portable terminal 1 of the present embodiment, the input keys 11 may be exposed partially without limitation to this configuration.

The torsion spring 31 disposed between the operation-side housing 10 and the display-side housing 20 operates also when shifting from the closed state to the second opened state. The operation of the torsion spring 31 in the course of shifting from the closed state to the second opened state will be then described.

In the closed state (the state shown in FIG. 2), the display-side housing 20 is difficult to slide relative to the operation-side housing 10 due to the biasing force of the torsion spring 31 as described above. Therefore, when shifting from the closed state to the second opened state, the user must apply a force in the sliding direction to slide the guide pins 22 and 23 of the display-side housing 20 along the guide grooves 12b and 13 of the operation-side housing 10.

When the force is applied in the sliding direction by the user, the torsion spring 31 is compressed while being rotated counterclockwise (refer to FIG. 6A), and reaches the mostly compressed state at about the midpoint of the course from start of slide movement to completion of slide movement (corresponding to the state shown in FIG. 6A). When the position of the display-side housing 20 relative to the operation-side housing 10 is shifted in the sliding direction from the mostly compressed state, the slide movement of the display-side housing 20 is assisted by the reaction of the compressed torsion spring 31. While the torsion spring 31 assists the slide movement, the torsion spring 31 is extended while being further rotated counterclockwise. When the second opened state is attained (when the slide movement is completed), the torsion spring 31 comes to have a biasing force substantially equal to that in the closed state. In this second opened state, the slide movement is difficult to perform without application of force at the beginning by the user, similarly to the closed state.

In the portable terminal 1 of the present embodiment, the shifting from the closed state to the first or second opened state or the shifting from the first or second opened state to the closed state requires application of a predetermined force due to the existence of the torsion spring 31. Therefore, the closed state is never spontaneously shifted to the opened state. On the other hand, once the predetermined force is applied for the slide movement, the slide movement can be semiautomatically performed since the slide movement is assisted by the torsion spring 31.

The plurality of input keys 11 provided on the portable terminal 1 may be constituted on the assumption that the portable terminal 1 is used with the longitudinal direction of the operation-side housing 10 being transverse, or may be constituted on the assumption that the portable terminal 1 is used with the longitudinal direction of the operation-side housing 10 being vertical.

The former structure is suitable for a portable terminal assumed to be used with the display screen 21 being in the landscape state in the first opened state and to be used with the display screen 21 being in the portrait state in the second opened state. More specifically, this structure is suitable, for example, for a portable terminal to which a usage such that operation for game, reproduction of moving image or the like is performed in the first opened state, and operation for sentence input (mail creation, etc.), browsing of books on Web, or the like is performed in the second opened state is applied.

The latter structure is suitable for a portable terminal assumed to be used with the display screen 21 being in the portrait state in the first opened state and to be used with the display screen 21 being in the landscape state in the second opened state. More specifically, this structure is suitable, for example, for a portable terminal to which a usage such that operation for telephone, sentence input (mail creation, etc.) is performed in the first opened state, and operation for reproduction of moving image, game operation or the like is performed in the second opened state is applied.

In the portable terminal 1 of the present embodiment, both states of the opened state with the display screen 21 in a portrait state and the opened state with the display screen 21 in a landscape state can be attained only by performing one step of slide action from the closed state, as described above. Therefore, the user can rapidly switch the portable terminal 1 from the closed state that is the most frequent state as a state for starting the slide operation to the opened state with the display screen 21 in a portrait state or the opened state with the display screen 21 in a landscape state. Since such a structure is constituted only by one slide mechanism, the portable terminal 1 can be provided inexpensively with the reduced number of part items.

The embodiment described above is an example of portable terminals to which the present invention is applicable, and of course the range of portable terminals to which the present invention is applicable is never limited to the structure of the above-mentioned embodiment.

For example, in the portable terminal 1 of the above-mentioned embodiment, the slide support mechanism includes the second guide groove 13 in addition to the first guide groove 12. However, the second guide groove 13 does not have to be provided (nor is the second guide pin 23 provided in this case). In this case, since the support of the display-side housing 20 to the operation-side housing 10 becomes unstable (the display-side housing is apt to rotate), it is needed to provide a rotation preventing function such that the first guide pin 22 is shaped into a square.

In the portable terminal 1 of the above-mentioned embodiment, the first guide groove 12 and the second guide groove 13 are provided on the operation-side housing 10, and the first guide pin 22 and the second guide pin 23 are provided on the display-side housing 20. However, without being limited to this structure, for example, the first guide pin and the second guide pin may be provided on the operation-side housing 10 while providing the first guide groove and the second guide groove on the display-side housing 20, reversely to the present embodiment. However, the structure of the present embodiment is more preferable since the guide grooves are invisible from the outside even in the opened state.

Although the torsion spring (auxiliary spring) 31 is provided to assist the slide movement of the display-side housing 20 in the portable terminal 1 of the above-mentioned embodiment, the torsion spring does not have to be provided. The auxiliary spring is never limited to the torsion spring, and any spring which can provide the above-mentioned effect can be used. For example, the auxiliary spring may be formed using a plurality of coil springs.

In the portable terminal 1 of the above-mentioned embodiment, further, the guide grooves 12 and 13 and the guide pins 22 and 23 constituting the slide support mechanism for slidably supporting the display-side housing 20 relative to the operation-side housing 10 are directly attached to the housings 10 and 20. However, the structure of portable terminals to which the present invention is applicable is never limited to this structure.

Figure 7A:
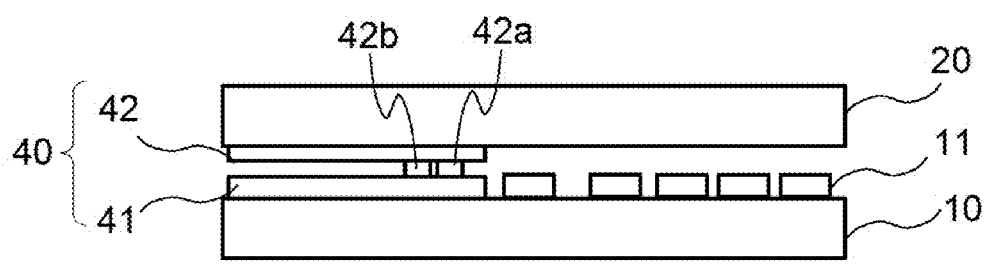
FIG. 7A is a side view for illustrating a first other embodiment of the present invention.

For example, as shown in FIG. 7A, the slide support mechanism can be unitized and attached as a unit (slide unit) to the operation-side housing 10 and the display-side housing 20. FIG. 7A shows one example of a portable terminal using the slide unit, wherein the slide unit 40 includes a groove plate (first member) 41 to be fixed to the operation-side housing 10, including guide grooves similar to the guide grooves 12 and 13 of the present embodiment, and a pin plate (second member) 42 to be fixed to the display-side housing 20, including guide pins 42a and 42b similar to the guide pins 22 and 23 of the present embodiment. The structure shown in FIG. 7 includes no auxiliary spring (e.g., torsion spring), but may include the auxiliary spring.

Figure 7B:
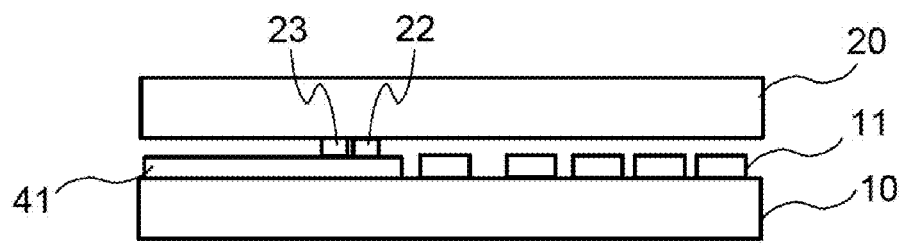
FIG. 7B is a side view for illustrating a second other embodiment of the present invention.
Figure 8:
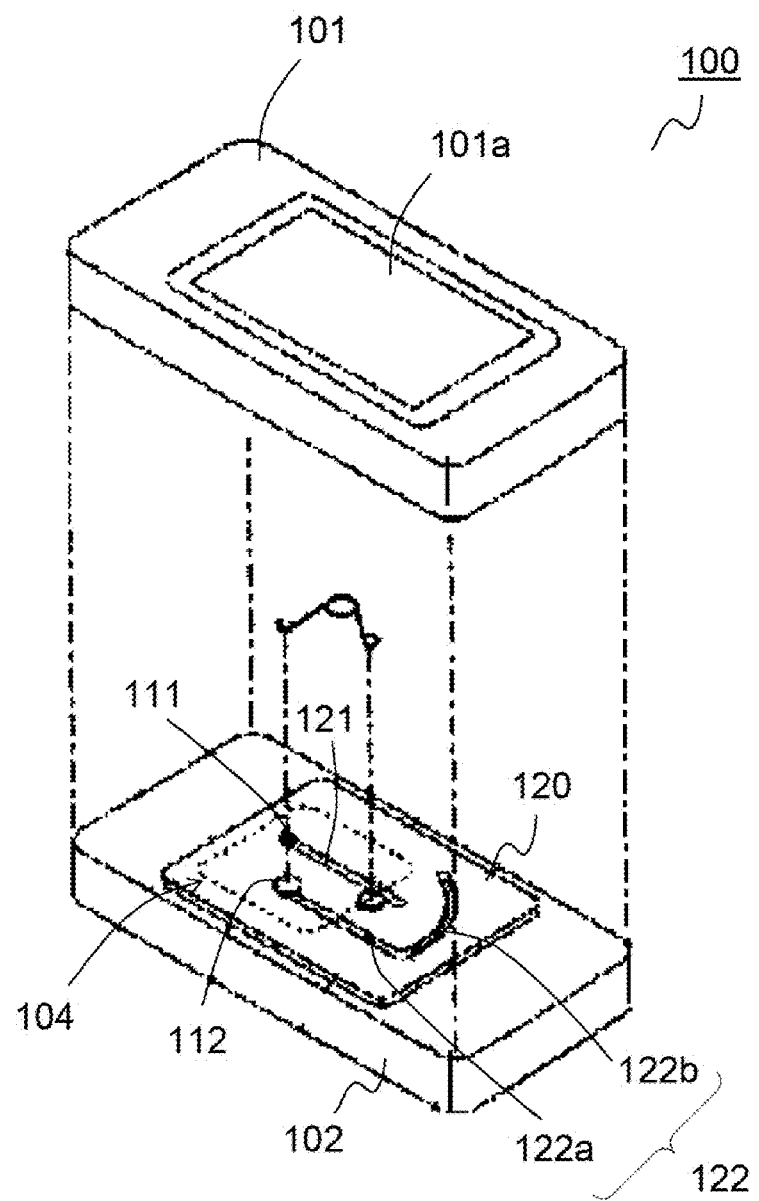
FIG. 8 is an exploded perspective view showing the structure of a conventional slide-type portable terminal.
Figure 9:
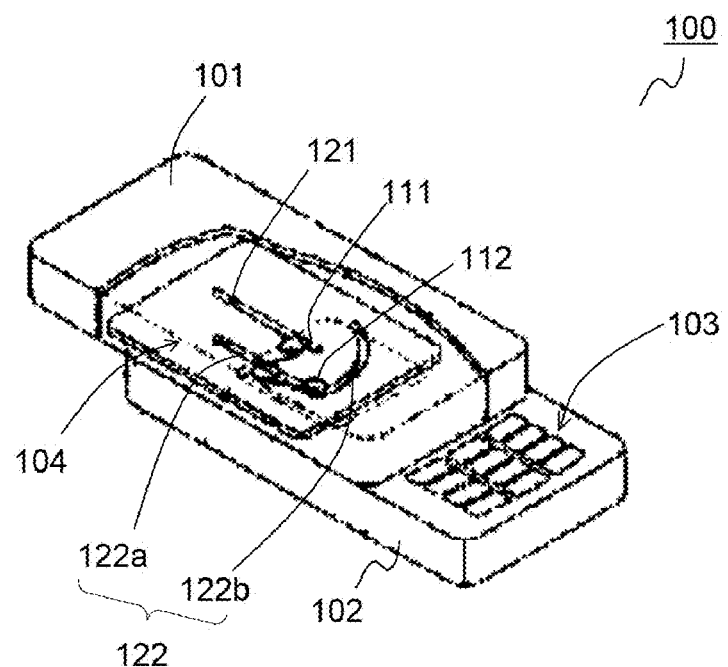
FIG. 9 is a perspective view of the conventional slide-type portable terminal, in which a display part is linearly slid while maintaining a portrait state of the display part.
Figure 10:
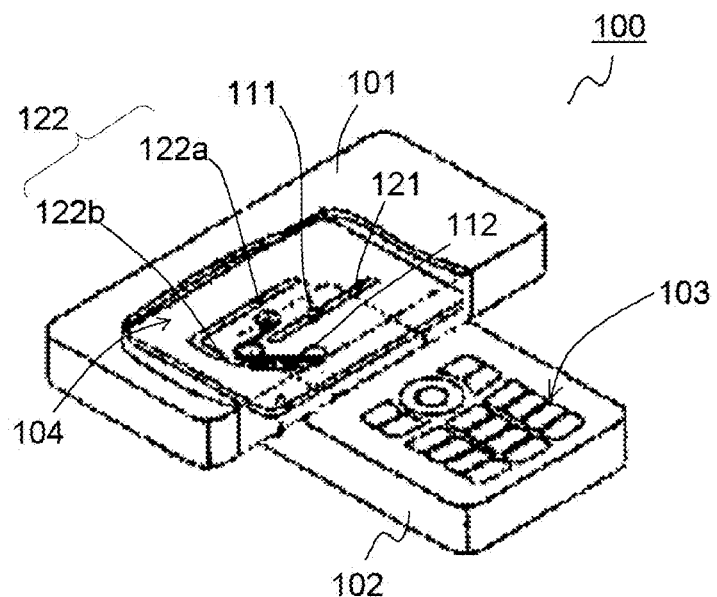
FIG. 10 is a perspective view of the conventional slide-type portable terminal, in which the display part is rotated into a landscape state.

Further, as shown in FIG. 7B, the guide pins 22 and 23 constituting the slide support mechanism may be directly attached to the display-side housing 20 as in the present embodiment, and the guide grooves may be provided on the groove plate 41 fixed to the operation-side housing 10.

The present invention is suitable for a portable terminal typified by a mobile device such as cellular phone, PDA, or smart phone.

What is claimed is:

1. A portable terminal, comprising:
a first housing including a plurality of input parts;
a second housing superposed on the first housing and having a display screen;
a slide support mechanism for slidably supporting the second housing relative to the first housing,
wherein the slide support mechanism includes:
a first guide groove provided on one side of the first housing side and the second housing side, and having a straight part and an arc-shaped arc part continuous with one end of the straight part; and
a first guide pin provided on the other side of the first housing side and the second housing side, and engaged with and held by the first guide groove so as to be slidable along both the straight part and the arc part, and
wherein the first guide pin is so disposed as to be located at an intersection between the straight part and the arc part when the second housing covers at least part of the input parts.

2. The portable terminal according to claim 1, wherein the slide support mechanism further includes a linear second guide groove parallel to the straight part, which is provided on the same side as the first guide groove of the first housing side and the second housing side, and a second guide pin to be engaged with and held by the second guide groove in a slidable manner, which is provided on the same side as the first guide pin of the first housing side and the second housing side.

3. The portable terminal according to claim 1, wherein the slide support mechanism includes an auxiliary spring which assists the slide movement of the second housing.

4. The portable terminal according to claim 3, wherein the auxiliary spring is a torsion spring, with one end of the torsion spring being rotatably supported by the first guide pin, and the other end thereof being rotatably supported by a spring holding pin provided on the same side as the first guide groove of the first housing side and the second housing side.

5. The portable terminal according to claim 1, wherein at least a part of members forming the slide support mechanism is attached directly to the first housing and the second housing.

6. The portable terminal according to claim 1, wherein the slide support mechanism is composed of a unit member including a first member to be fixed to the first housing and a second member to be fixed to the second housing, which is provided to be slidable relative to the first member.

7. A portable terminal, comprising:
a first housing including a plurality of input parts;
a second housing superposed on the first housing and having a display screen;
a slide support mechanism for slidably supporting the second housing relative to the first housing,
wherein the slide support mechanism includes:
a first guide groove provided on one side of the first housing side and the second housing side, and having a straight part and an arc-shaped arc part continuous with one end of the straight part;
a first guide pin provided on the other side of the first housing side and the second housing side, and engaged with and held by the first guide groove so as to be slidable along both the straight part in the arc part;
a linear second guide groove parallel to the straight part, which is provided on the same side as the first guide groove of the first housing side and the second housing side;
a second guide pin to be engaged with and held by the second guide groove in a slidable manner, which is provided on the same side as the first guide pin of the first housing side and the second housing side; and
an auxiliary spring which assists the slide movement of the second housing,
wherein the first guide pin is so disposed as to be located at an intersection between the straight part and the arc part when the second housing covers at least part of the input parts, and
wherein the auxiliary spring is a torsion spring, with one end of the torsion spring being rotatably supported by the first guide pin, and the other end thereof being rotatably supported by a spring holding pin provided on the same side as the first guide groove of the first housing side and the second housing side.

8. A portable terminal, comprising:
a first housing including a plurality of input parts;
a second housing superposed on the first housing and having a display screen;
a slide support mechanism for slidably supporting the second housing relative to the first housing,
wherein the slide support mechanism includes:
a first guide groove provided on one side of the first housing side and the second housing side, and having a straight part and an arc-shaped arc part continuous with one end of the straight part; and
a first guide pin provided on the other side of the first housing side and the second housing side, and engaged with and held by the first guide groove in a slidable manner, and
wherein the input parts which are covered by the second housing when the first guide pin is located at a cross-point between the straight part and the arc part are entirely or partially exposed in both cases of moving the first guide pin located at the cross-point between the straight part and the arc part along the straight part, and moving it along the arc part.

* * * * *